United States Patent
Wada

(10) Patent No.: US 9,074,633 B2
(45) Date of Patent: Jul. 7, 2015

(54) BEARING

(71) Applicant: KABUSHIKI KAISHA TOYOTA JIDOSHOKKI, Kariya-shi, Aichi-ken (JP)

(72) Inventor: Kenichi Wada, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/160,967

(22) Filed: Jan. 22, 2014

(65) Prior Publication Data

US 2014/0205227 A1    Jul. 24, 2014

(30) Foreign Application Priority Data

Jan. 23, 2013   (JP) .................................. 2013-10107

(51) Int. Cl.
*F16C 33/10*   (2006.01)
*F16C 33/66*   (2006.01)
*B66F 9/075*   (2006.01)

(52) U.S. Cl.
CPC .......... *F16C 33/6677* (2013.01); *F16C 33/1065* (2013.01); *B66F 9/07586* (2013.01)

(58) Field of Classification Search
CPC .................................................... F16C 33/1065
USPC .......................................... 384/286, 291, 292
See application file for complete search history.

(56) References Cited

U.S. PATENT DOCUMENTS

| | | | | |
|---|---|---|---|---|
| 1,961,029 A | * | 5/1934 | Benedek | 384/287 |
| 2,810,614 A | * | 10/1957 | Rettman | 384/415 |
| 2004/0217571 A1 | | 11/2004 | Miyake et al. | |
| 2009/0268996 A1 | | 10/2009 | Yamamoto et al. | |

FOREIGN PATENT DOCUMENTS

| | | | |
|---|---|---|---|
| DE | 2100365 A1 | * | 7/1972 |
| JP | 03134292 A | * | 6/1991 |
| JP | 05-202936 A | | 8/1993 |
| JP | 2004-322871 A | | 11/2004 |

* cited by examiner

*Primary Examiner* — Phillip A Johnson
(74) *Attorney, Agent, or Firm* — Sughrue Mion, PLLC

(57) ABSTRACT

A bearing rotatably supports an axle and is held by an axle support. The bearing includes a bearing body having an oil groove, an inlet and an outlet. Lubricating oil is supplied into and held in the oil groove through the inlet. The oil groove is formed in an inner circumferential surface of the bearing body so as to extend in a circumferential direction of the bearing body. The bearing body is held by an inner circumferential surface of the axle support with an outer circumferential surface of the bearing body in contact with the inner circumferential surface of the axle support. The outlet is opened to an axial end of the bearing body for allowing the lubricating oil in the oil groove to be discharged from the bearing body.

3 Claims, 2 Drawing Sheets

BEARING

BACKGROUND OF THE INVENTION

The present invention relates to a bearing for rotatably supporting an axle.

In an industrial vehicle such as a forklift truck, a rear axle (or an axle) is attached to a vehicle body so as to be swingable up and down. An axle support is provided in the vehicle body and has a circular hole (or a bearing holding hole). The rear axle is rotatably supported by the axle support via a bushing (a bearing) disposed in the circular hole of the axle support (See Japanese Unexamined Patent Application Publication No. 2004-322871).

In the bearing for rotatably supporting the axle as disclosed in the Publication No. 2004-322871, it is conceivable to improve lubrication between the outer circumferential surface of the axle and the inner circumferential surface of the bearing body by forming an oil groove in the inner circumferential surface of the bearing body to extend in the circumferential direction of the bearing body and supplying the lubricating oil to the oil groove. The lubricating oil supplied to and held in the oil groove is discharged from both axial ends of the bearing body via a gap between the outer circumferential surface of the axle and the inner circumferential surface of the bearing body. However, since such gap is very narrow, the lubricating oil solidified in the oil groove and foreign matters involved in the oil groove are hardly discharged from the oil groove via the gap. The solidified lubricating oil and the foreign matters present in the oil groove may be accumulated and caught between the axle and the bearing body, which increases the friction between the axle and the bearing body.

The present invention is directed to providing a bearing that allows discharge of the solidified lubricating oil and the foreign matters present in the oil groove despite its simple structure.

SUMMARY OF THE INVENTION

In accordance with an aspect of the present invention, there is provided a bearing that rotatably supports an axle and is also held by an axle support. The bearing includes a bearing body having an oil groove, an inlet and an outlet. Lubricating oil is supplied into and held in the oil groove through the inlet. The oil groove is formed in an inner circumferential surface of the bearing body so as to extend in a circumferential direction of the bearing body. The bearing body is held by an inner circumferential surface of the axle support with an outer circumferential surface of the bearing body in contact with the inner circumferential surface of the axle support. The outlet is opened to an axial end of the bearing body for allowing the lubricating oil in the oil groove to be discharged from the bearing body.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
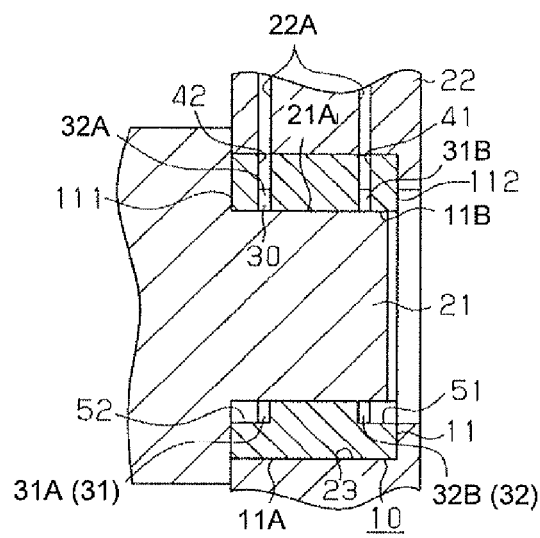
FIG. 1 is a sectional view showing a bearing according to an embodiment of the present invention, wherein the bearing is held in a bearing holding hole of an axle support.
Figure 2:
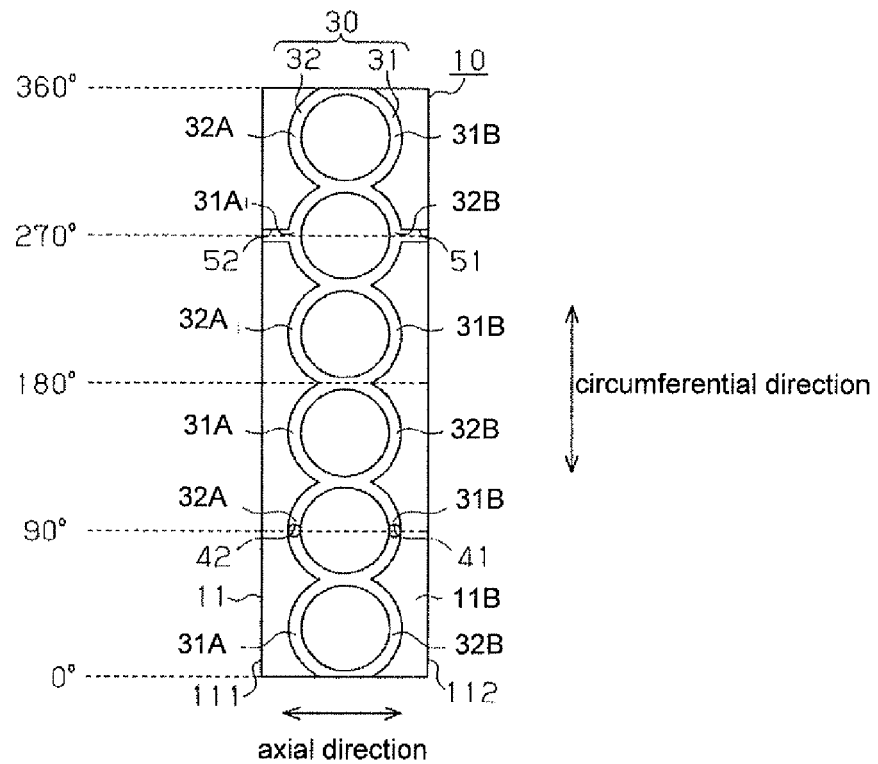
FIG. 2 is a development view showing the entire circumference of the inner circumferential surface of a bearing body of the bearing of FIG. 1.
Figure 3:
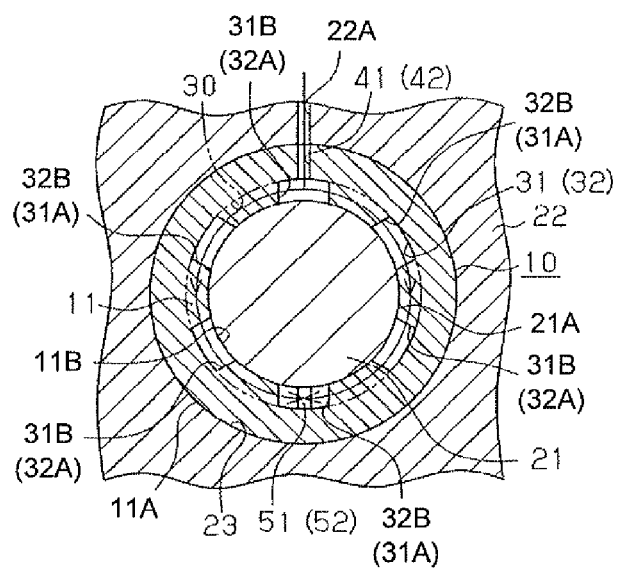
FIG. 3 is a sectional view showing an axle, the bearing and the axle support of FIG. 1 for illustrating a flow of lubricating oil.

The following will describe the bearing according to the embodiment of the present invention with reference to FIGS. 1 to 3. The bearing of the present embodiment is used for rotatably supporting an axle (or a rear axle) attached to a body of a vehicle such as a forklift truck so as to be swingable up and down.

As shown in FIG. 1, the bearing 10 is held by the inner circumferential surface of a bearing holding hole 23 formed in an axle support 22 that supports an axle 21 with the outer circumferential surface 11A of a bearing body 11 in contact with the inner circumferential surface of the bearing holding hole 23. The bearing 10 rotatably supports the axle 21 with the outer circumferential surface 21A of the axle 21 in slide contact with the inner circumferential surface 11B of the bearing body 11.

As shown in FIG. 2, an oil groove 30 is formed in the inner circumferential surface 11B of the bearing body 11 to extend in the circumferential direction of the bearing body 11 and serves to hold lubricating oil (or grease). The oil groove 30 is formed over the entire circumference in the circumferential direction of the bearing body 11. The oil groove 30 is formed by a first groove 31 and a second groove 32 each of which is formed so as to meander along the circumferential direction of the bearing body 11.

The first groove 31 includes a plurality of first meandering portions 31A (or three first meandering portions 31A in the present embodiment) near a first axial end 111 of the bearing body 11 and a plurality of second meandering portions 31B (or three second meandering portions 31B in the present embodiment) near a second axial end 112 of the bearing body 11 as shown in FIG. 2. The second groove 32 includes a plurality of first meandering portions 32A (or three first meandering portions 32A in the present embodiment) near the first axial end 111 of the bearing body 11 and a plurality of second meandering portions 32B (or three second meandering portions 32B in the present embodiment) near the second axial end 112 of the bearing body 11 as shown in FIG. 2.

The first meandering portions 31A of the first groove 31 and the first meandering portions 32A of the second groove 32 are alternately arranged in the circumferential direction of the bearing body 11. The second meandering portions 31B of the first groove 31 and the second meandering portions 32B of the second groove 32 are alternately arranged in the circumferential direction of the bearing body 11. The first meandering portions 31A of the first groove 31 and the second meandering portions 32B of the second groove 32 are arranged to be opposed to each other in the axial direction of the bearing body 11. The second meandering portions 31B of the first groove 31 and the first meandering portions 32A of the second groove 32 are arranged to be opposed to each other in the axial direction of the bearing body 11. The first groove 31 and the second groove 32 intersect with each other between the first meandering portions 31A, 32A and the second meandering portions 31B, 32B to communicate with each other in the intersection portion.

The first groove 31 and the second groove 32 are formed so that the first meandering portions 32A of the second groove 32 are arranged in positions 180 degrees apart from the first meandering portions 31A of the first groove 31 and the second meandering portions 32B of the second groove 32 are arranged in positions 180 degrees apart from the second meandering portions 31B of the first groove 31 in the circumferential direction of the bearing body 11, respectively.

An inlet 41 is provided in one of the second meandering portions 31B of the first groove 31, through which lubricating oil is supplied to the second meandering portion 31B. An inlet 42 is provided in one of the first meandering portions 32A of the second groove 32, through which lubricating oil is supplied to the first meandering portion 32A. The inlets 41 and 42 are provided in the second meandering portion 31B of the first groove 31 and the first meandering portion 32A of the second groove 32 arranged to be opposed to each other in the axial direction of the bearing body 11 among the second meandering portions 31B of the first groove 31 and the first meandering portions 32A of the second groove 32. Each of the inlets 41 and 42 is a circular through-hole that extends in the radial direction of the bearing body 11.

An outlet 51 is formed in the inner circumferential surface 11B of the bearing body 11 so as to communicate with the second meandering portion 32B of the second groove 32 arranged in a position 180 degrees apart from the second meandering portion 31B of the first groove 31 in which the inlet 41 is provided. Therefore, the inlet 41 and the outlet 51 are arranged in positions 180 degrees apart from each other in the circumferential direction of the bearing body 11. The outlet 51 is an axial groove that communicates with the second meandering portion 32B of the second groove 32 at a position of the second meandering portion 32B closest to the second axial end 112 of the bearing body 11 and is also opened to the second axial end 112.

An outlet 52 is formed in the inner circumferential surface 11B of the bearing body 11 so as to communicate with the first meandering portion 31A of the first groove 31 arranged in a position 180 degrees apart from the first meandering portion 32A of the second groove 32 in which the inlet 42 is provided. Therefore, the inlet 42 and the outlet 52 are arranged in positions 180 degrees apart from each other in the circumferential direction of the bearing body 11. The outlet 52 is an axial groove that communicates with the first meandering portion 31A of the first groove 31 at a position of the first meandering portion 31A closest to the first axial end 111 of the bearing body 11 and is also opened to the first axial end 111.

The following will describe the operation of the above-described bearing. As shown in FIG. 3, lubricating oil in a lubricating oil source (not shown) is supplied to the oil groove 30 via inlet passages 22A formed in the axle support 22 and the inlets 41, 42. The lubricating oil supplied to the oil groove 30 from the inlets 41 and 42 flows along the first groove 31 and the second groove 32 so as to divide into both circumferential sides of the bearing body 11 and then meets in the outlets 51 and 52 to be discharged from the outlets 51 and 52. Thus, solidified lubricating oil and foreign matters present in the first groove 31 and the second groove 32 are discharged out of the bearing body 11 through the outlets 51 and 52 together with the lubricating oil supplied to the first groove 31 and the second groove 32 from the inlets 41 and 42, which prevents the increase of the friction between the axle 21 and the bearing body 11 due to the fact that the solidified lubricating oil and the foreign matters present in the first groove 31 and the second groove 32 are accumulated and caught between the axle 21 and the bearing body 11.

The lubricating oil supplied to the oil groove 30 from the inlets 41 and 42 flows along the first groove 31 and the second groove 32 so as to divide into both circumferential sides of the bearing body 11 and then meets in the outlets 51 and 52 to be discharged from the outlets 51 and 52. Thus, the lubricating oil is uniformly supplied over the entire circumference in the circumferential direction of the bearing body 11. As a result, lubrication between the outer circumferential surface 21A of the axle 21 and the inner circumferential surface 11B of the bearing body 11 is improved.

The following will describe the advantageous effects of the above-described bearing.

(1) The outlets 51 and 52 are formed in the bearing body 11 so as to be opened to the second axial end 112 and the first axial end 111 of the bearing body 11 and also allow lubricating oil supplied from the inlets 41 and 42 to the oil groove 30 to be discharged out of the bearing body 11, respectively. Thus, solidified lubricating oil and foreign matters present in the oil groove 30 are discharged out of the bearing body 11 through the outlets 51 and 52 together with the lubricating oil supplied to the oil groove 30 from the inlets 41 and 42. The outlets 51 and 52 may be formed in the bearing body 11 so as to be opened to the outer circumferential surface 11A of the bearing body 11. However, the bearing 10 is held by the inner circumferential surface of the axle support 22 with the outer circumferential surface 11A of the bearing body 11 in contact with the inner circumferential surface of the axle support 22. For this reason, if the outlets 51 and 52 are opened to the outer circumferential surface 11A of the bearing body 11, a space needs to be formed in the inner circumferential surface of the bearing holding hole 23 of the axle support 22 for collecting the solidified is lubricating oil and foreign matters discharged from the outlets 51 and 52, which complicates the axle support 22 in structure. In the present embodiment wherein the outlets 51 and 52 are opened to the second axial end 112 and the first axial end 111 of the bearing body 11, respectively, no space needs to be formed in the inner circumferential surface of the bearing holding hole 23 of the axle support 22 for collecting the solidified lubricating oil and foreign matters discharged from the outlets 51 and 52, which allows the discharge of the solidified lubricating oil and foreign matters present in the oil groove 30 by a simple structure.

(2) The oil groove 30 is formed over the entire circumference in the circumferential direction of the bearing body 11. The inlets 41, 42 and the outlets 51, 52 are arranged in positions 180 degrees apart from each other in the circumferential direction of the bearing body 11, respectively. If the inlets 41, 42 and the outlets 51, 52 are arranged in positions 90 degrees apart from each other in the circumferential direction of the bearing body 11, respectively, the lubricating oil supplied to the oil groove 30 from the inlets 41 and 42 flows along the oil groove 30 so as to divide into both circumferential sides of the bearing body 11, that is, the first circumferential side closer to the outlets 51, 52 and the second circumferential side opposite to the first circumferential side. When the lubricating oil flowing along the oil groove 30 on the first circumferential side of the bearing body 11 is discharged from the outlets 51 and 52, the lubricating oil flowing along the oil groove 30 on the second circumferential side of the bearing body 11 reaches positions 180 degrees apart from the outlets 51 and 52 in the circumferential direction of the bearing body 11. If the supply of the lubricating oil to the oil groove 30 from the inlets 41 and 42 is stopped, the lubricating oil flowing along the oil groove 30 on the second circumferential side of the bearing body 11 no longer flows in the downstream direction of the lubricating oil from the positions 180 degrees apart from the outlets 51 and 52 in the circumferential direction of the bearing body 11. As a result, the lubricating oil is not supplied to a region that is present on the side of the bearing body 11 opposite to the inlets 41 and 42 and also extends from the outlets 51 and 52 to the positions 180 degrees apart from the outlets 51 and 52 in the circumferential direction of the bearing body 11. In the present embodiment wherein the lubricating oil supplied to the oil groove 30 from the inlets 41 and 42 flows along the oil groove 30 to divide into both circumferential sides of the bearing body 11 and then meets in the outlets 51 and 52 to be discharged from the outlets 51 and 52, however, the lubricating oil is uniformly supplied over the entire circumference in the circumferential direction of the beating body 11. As a result, lubrication between the outer circumferential surface 21A of the axle 21 and the inner circumferential surface 11B of the bearing body 11 is improved.

(3) The outlet 51 is formed so as to communicate with the second meandering portion 32B of the second groove 32 at a position of the second meandering portion 32B closest to the second axial end 112 of the bearing body 11. The outlet 52 is formed so as to communicate with the first meandering portion 31A of the first groove 31 at a position of the first meandering portion 31A closest to the first axial end 111 of the bearing body 11. Thus, the outlets 51 and 52 are made as short as possible. Therefore, the solidified lubricating oil and the foreign matters present in the oil groove 30 are efficiently discharged from the outlets 51 and 52 together with the lubricating oil supplied to the oil groove 30 from the inlets 41 and 42.

The above-described embodiment may be modified as explained below.

Figure 4:
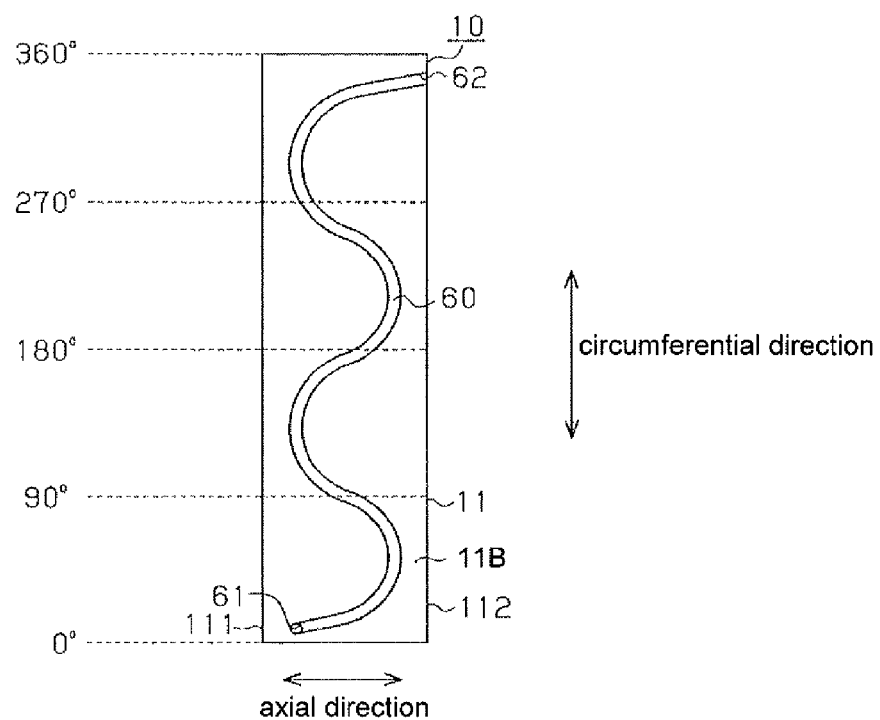
FIG. 4 is a development view showing the entire circumference of the inner circumferential surface of a bearing body of a bearing according to another embodiment of the present invention.

As shown in FIG. 4, an oil groove 60 does not need to be formed over the entire circumference in the circumferential direction of the bearing body 11. An inlet 61 is provided at a starting end of the oil groove 60. A terminal end of the oil groove 60 is an outlet 62 that allows lubricating oil supplied to the oil groove 60 from the inlet 61 to be discharged out of the bearing body 11. The oil groove 60 is formed over a range of an angle of 180 degrees or more in the circumferential direction of the bearing body 11.

When the axle 21 is supported by the axle support 22 via the bearing 10, a load due to the own weight of the axle 21 acts on the inner circumferential surface 11B of the bearing body 11 in a range of an angle of less than 180 degrees in the circumferential direction of the bearing body 11. In the embodiment shown in FIG. 4, the oil groove 60 is formed over a range of an angle of 180 degrees or more in the circumferential direction of the bearing body 11. Therefore, when the bearing 10 is held in the bearing holding hole 23 such that the load due to the own weight of the axle 21 acts on the inner circumferential surface 11B of the bearing body 11 in which the oil groove 60 is formed, lubrication is secured between the inner circumferential surface 11B of the bearing body 11, on which the load due to the own weight of the axle 21 acts, and the outer circumferential surface 21A of the axle 21. Further, solidified lubricating oil and foreign matters present in the oil groove 60 are discharged from the outlet 62 together with the lubricating oil supplied to the oil groove 60 from the inlet 61.

In the above-described embodiment, the oil groove 30 may be formed by only the first groove 31.

In the above-described embodiment, the inlet 41 may be provided in only the first meandering portion 32A of the second groove 32.

In the above-described embodiment, each of the inlets 41 and 42 may be a triangular or square through-hole. The shape of the inlets 41 and 42 is not specifically limited.

In the above-described embodiment, the inlets 41 and 42 may be formed to extend in the axial direction of the bearing body 11.

In the above-described embodiment, each of the outlets 51 and 52 may be a through-hole that passes through the bearing body 11 in the axial direction of the bearing body 11.

In the above-described embodiment, the outlet 51 may be provided only in the first meandering portion 31A of the first groove 31.

In the above-described embodiment, the outlets 51 and 52 may communicate with the intersection portion of the first groove 31 and the second groove 32. In this case, it is preferable to arrange the inlets 41, 42 and the outlets 51, 52 in positions 180 degrees apart from each other in the circumferential direction of the bearing body 11, respectively.

In the above-described embodiment, the inlets 41, 42 and the outlets 51, 52 may be arranged in positions 90 degrees apart from each other in the circumferential direction of the bearing body 11, respectively.

In the above-described embodiment, the oil grooves 30 and 60 may be formed to extend linearly in the circumferential direction of the bearing body 11.

The present invention is embodied in the bearing for rotatably supporting the axle (or the rear axle) attached to the body of the vehicle such as a forklift truck to be swingable up and down. However, the present invention is not limited to such bearing. In short, the present invention is applicable to any bearing that rotatably supports an axle.

What is claimed is:

1. A bearing that rotatably supports an axle and is also held by an axle support, comprising:
   a bearing body having an oil groove, an inlet and an outlet, wherein lubricating oil is supplied into and held in the oil groove through the inlet, wherein the oil groove is formed in an inner circumferential surface of the bearing body so as to extend in a circumferential direction of the bearing body, wherein the oil groove is formed over an entire circumference in the circumferential direction of the bearing body, wherein the bearing body is held by an inner circumferential surface of the axle support with an outer circumferential surface of the bearing body in contact with the inner circumferential surface of the axle support, wherein the outlet is opened to an axial end of the bearing body for allowing the lubricating oil in the oil groove to be discharged from the bearing body, wherein
   the inlet and the outlet are arranged in positions 180 degrees apart from each other in the circumferential direction of the bearing body, and wherein the lubricating oil supplied into the oil groove through the inlet flows along the oil groove to divide into both circumferential sides of the bearing body and then meets in the outlet to be discharged from the outlet.

2. The bearing according to claim 1, wherein the oil groove is formed so as to meander along the circumferential direction of the bearing body, wherein the outlet communicates with the oil groove at a position of the oil groove closest to the axial end of the bearing body.

3. The bearing according to claim 1, wherein a starting end of the oil groove is the inlet and a terminal end of the oil groove is the outlet, wherein the oil groove is formed over a range of an angle of 180 degrees or more in the circumferential direction of the bearing body.

* * * * *